May 15, 1923.
S. A. FLOWERS
1,455,526
REAR SIGNAL DEVICE FOR AUTOMOBILES
Filed April 3, 1922
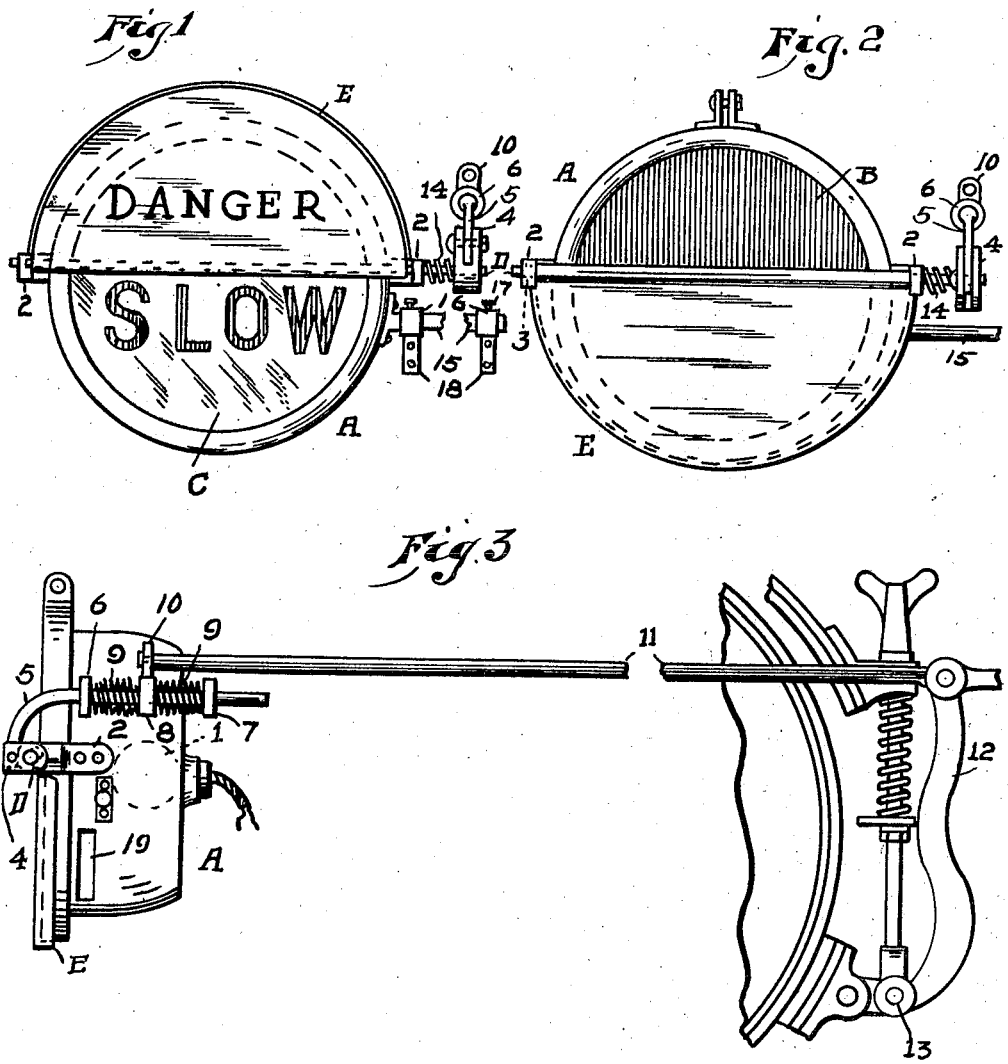

Patented May 15, 1923.

1,455,526

UNITED STATES PATENT OFFICE.

STANLEY A. FLOWERS, OF PITTSBURGH, PENNSYLVANIA, ASSIGNOR OF ONE-THIRD TO J. LEWIS PALLEY AND ONE-THIRD TO JOHN HEATON, BOTH OF PITTSBURGH, PENNSYLVANIA.

REAR-SIGNAL DEVICE FOR AUTOMOBILES.

Application filed April 3, 1922. Serial No. 548,911.

*To all whom it may concern:*

Be it known that I, STANLEY A. FLOWERS, a citizen of the United States, and residing in the city of Pittsburgh, in the county of Allegheny and State of Pennsylvania, have invented or discovered the new, useful, and Improved Rear-Signal Devices for Automobiles, of which the following is a specification.

My invention consists in a new and improved rear warning device for motor vehicles.

The desirability of displaying a warning signal at the rear of a vehicle when the vehicle is about to slow down to stop or turn aside is generally recognized, and "rear stop lights", which shine when the brakes are applied, have come into use. These signal devices involve the use of an additional electric bulb to which current is supplied, by night and day, whenever the brakes are applied. The result is an additional drain on the storage battery which is objectionable. Attempts have been made to use the tail light of the vehicle for displaying the cautionary signal but the construction of the same has been such that the results have been unsatisfactory, the normal function of the tail light being usually interfered with and the cautionary signal being confused and more or less unintelligible.

The object which I have in view is the provision of a tail light which may be successfully used as such, and also as a cautionary rear signal, preferably automatically operated in unison with the service brakes of the vehicle.

For the accomplishment of the purpose in view, I divide the lens of the tail light into two parts, preferably along the horizontal axis of the same. One portion, preferably the upper portion of the glass is red, so that the usual red light required by law is normally displayed at the rear of the vehicle, while the other portion of the lens is provided with a cautionary word or warning, such, for instance as "Stop", "Danger" or "Slow", either in red letters on a white back or ground or vice versa. In front of the lens is swingingly mounted an opaque shutter, the same being arranged, when in one position, to cover and conceal the cautionary portion of the lens, leaving the plain red portion exposed for the light to shine through, and, when in the other position to cover and conceal the plain portion and expose the cautionary portion for the light to shine through. The shutter is operated at the will of the driver. Thus, it is preferably connected with the service brakes mechanism in such a manner that while the vehicle is standing or traveling with the brakes off, the shutter is in the position first above mentioned, the tail light shining red as required by law and custom, but when the service brakes are applied, the shutter is shifted to conceal the red glow of the normal tail light and expose the cautionary signal. When the brakes are released, the shutter is automatically reversed into its first mentioned position.

I have also invented new and improved means, hereinafter illustrated, for attaching the rear license plate and illuminating the same from the tail light.

Other novel features of construction and arrangement of parts will appear from the following description.

In the accompanying drawings, Fig. 1 is a face view of a tail light fitted with my invention, the shutter being shown in the position which it assumes when and while the brakes are applied; Fig. 2 is a similar view showing the normal position of the shutter when the brakes are released, and Fig. 3 is a side elevation illustrating diagrammatically the operative connection of the shutter with the brakes.

The following is a detailed description of the drawings,

A represents the tail light of a motor vehicle of any known type, provided with an electric bulb 1 and a glass or lens closing the casing.

One portion B, of the lens, preferably the upper portion is of red or ruby glass so that the bulb will shine the usual red tail light, while the other portion C, of the lens, preferably the lower portion, has a cautionary warning display in contrasting color on the glass; either white letters on a red background or vice versa.

The cautionary warning may be the word "Slow", for instance, as shown in Fig. 1.

At either end of its horizontal axis the lamp casing is provided with a bracket 2 attached to the casing and provided with horizontally disposed bearing holes 3 in which are journaled the ends of the horizontally disposed rock shaft D which is thus disposed in front of the lens.

E is a semi-circular shutter of metal or other opaque material attached along its straight edge, as by soldering or welding, to the shaft D, so that as said shaft is rocked the shutter is moved from its position shown in Fig. 1 to that shown in Fig. 2 and vice versa.

One of the ends of the shaft D protrudes and has rigidly fastened thereon a crank member 4 which is bifurcated to receive the downwardly curved end of the finger shaft 5 which is pivotally connected to the member 4. The finger shaft 5 is provided with a fixed collar 6 toward its curved end and its other end is threaded to receive a nut 7. 8 is a loosely fitting collar slidably mounted on the finger shaft 5, the helical springs 9 being coiled on said shaft between the fixed collar 6 and the slidable collar 8, and the said slidable collar 8 and the nut 7, respectively. The collar 8 is provided with an upwardly extending ear 10 which is securely attached to the rear end of the link 11 which extends forwardly and is connected to the arm 12 of the brake equalizer shaft 13.

A helical spring 14 is coiled about the shaft D between the bracket 2 and the crank member 4 is so disposed as to assist in returning the shutter into its position shown in Fig. 2 and normally maintaining it in said position.

When the service brakes are not set, the shutter is in the position shown in Figs. 2 and 3, but when the service brakes are applied the arm 12 swings forwardly, thus rocking the shaft D and shifting the shutter into the position shown in Fig. 1 with the plain red light obscured and the cautionary warning displayed and illuminated. As soon as the brakes are released, the arm 12 resumes its position shown in Fig. 3, and the shutter drops into the position shown in Figs. 2 and 3, obscuring the cautionary warning and uncovering the upper portion of the lens to accomplish the normal tail light function.

The springs 9 enable the shutter to be shifted without jarring or unnecessary noise.

To make the device of practical service in the daytime, when the tail light is not illuminated, I may paint or otherwise display in contrasting colors on the shutter a warning such as the word "Danger" as shown in Fig. 1, so that when the shutter is thrown up by the application of the brakes and the eye of the driver of the vehicle behind is caught by the moving shutter, the cautionary word on the reverse side of the shutter will be read.

15 is a shaft having one end provided with a flange curved to fit the lamp casing and pierced for riveting thereto. The shaft extends horizontally and is provided with collars 16 slidable upon said shaft and fixable in any adjustable position by means of set screws 17. Said collars are provided with depending strap portions 18 to which the rear license may be attached. The wall of the lamp casing is slotted, as at 19, to illuminate the plate.

What I desire to claim is:—

1. A combination tail light and rear signal device for motor vehicles consisting of a lamp casing adapted to contain a lamp and provided with a glass wall, said wall being diametrically divided into two portions, one portion being of solid color to produce the customary tail light effect while the other portion is provided with an illuminable cautionary signal, a shutter of proper size to cover one portion of said glass at a time, said shutter being swingingly mounted in front of said glass wall in such a manner that its axis is in substantially the same plane as the line of demarcation between the two portions of said glass wall and being arranged to swing through half a circle, and means convenient to the operator for swinging said shutter whereby when said shutter is in one position the customary tail light is exposed and the cautionary signal is covered but when the shutter is swung to its opposite position the tail light is covered and the cautionary signal is exposed.

2. A combination tail light and rear signal device for motor vehicles consisting of a lamp casing adapted to contain a lamp and provided with a glass wall, said wall being diametrically divided into two portions, one portion being of solid color to produce the customary tail light effect while the other portion is provided with an illuminable cautionary signal, a shutter of proper size to cover one portion of said glass at a time, said shutter being swingingly mounted in front of said glass wall in such a manner that its axis is in substantially the same plane as the line of demarcation between the two portions of said glass wall and being arranged to swing through half a circle, and means operatively connecting said shutter with the brake mechanism of the motor vehicle in such a manner that when the brakes are applied the shuter is thrown to obscure the tail light and expose the cautionary signal and when the brakes are released the shutter is thrown to obscure the cautionary signal and expose the tail light.

3. A combination tail light and rear signal device for motor vehicles comprising a lamp casing containing a lamp and provided with a glass wall, said wall being divided into two portions, one of said portions being colored to form the ordinary tail light while the other portion is provided with a cautionary signal, and both portions being continuously exposed to the rays of the lamp, a part closure for said wall consisting of a shutter hinged to said casing substantially in the plane of the line of division between said portions whereby said shutter may be turned into one position to obscure the cautionary signal and display the tail light or be turned into the other position to obscure the tail light and display the cautionary signal, means whereby the application of the vehicle brakes automatically turns said shutter into the second named position, and means whereby the release of the brakes automatically returns said shutter into its first named position.

Signed at Pittsburgh, Pa., this 30th day of March, 1922.

STANLEY A. FLOWERS.